US010958079B2

(12) United States Patent
Liu et al.

(10) Patent No.: US 10,958,079 B2
(45) Date of Patent: Mar. 23, 2021

(54) ENERGY HARVESTER WITH MULTIPLE-INPUT MULTIPLE-OUTPUT SWITCHED-CAPACITOR (MIMOSC) CIRCUITRY

(71) Applicant: Intel Corporation, Santa Clara, CA (US)

(72) Inventors: Xiaosen Liu, Portland, OR (US); Khondker Z. Ahmed, Hillsboro, OR (US); Vivek K. De, Beaverton, OR (US); Nachiket V. Desai, Hillsboro, OR (US); Suhwan Kim, Portland, OR (US); Harish K. Krishnamurthy, Beaverton, OR (US); Turbo Majumder, Portland, OR (US); Krishnan Ravichandran, Saratoga, CA (US); Christopher Schaef, Hillsboro, OR (US); Vaibhav A. Vaidya, Portland, OR (US); Sriram R. Vangal, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 393 days.

(21) Appl. No.: 15/939,120

(22) Filed: Mar. 28, 2018

(65) Prior Publication Data
US 2019/0044341 A1    Feb. 7, 2019

(51) Int. Cl.
*H02J 1/00* (2006.01)
*H02J 3/00* (2006.01)
(Continued)

(52) U.S. Cl.
CPC ............... *H02J 3/385* (2013.01); *G05F 1/67* (2013.01); *H02J 3/38* (2013.01); *H02J 3/387* (2013.01);
(Continued)

(58) Field of Classification Search
CPC .. H02J 3/385; H02J 3/38; H02J 3/387; H02M 1/10; H02M 3/07; H02M 3/156;
(Continued)

(56) References Cited

U.S. PATENT DOCUMENTS

| 2009/0072800 A1* | 3/2009 | Ramadass ........... H02M 3/1584 323/271 |
| 2014/0070787 A1* | 3/2014 | Arno ....................... H02M 3/07 323/304 |

(Continued)

OTHER PUBLICATIONS

Amin, S.S. et al., "MISIMO: A Multi-Input Single-Inductor Multi-Output Energy Harvester Employing Event-Driven MPPT Control to Achieve 89% Peak Efficiency and a 60,000x Dynamic Range in 28nm FDSOI," in Proc. IEEE International Solid-State Circuits Conference (ISSCC), Feb. 2018.
(Continued)

*Primary Examiner* — Rexford N Barnie
*Assistant Examiner* — Rasem Mourad
(74) *Attorney, Agent, or Firm* — Alliance IP, LLC (57) ABSTRACT

In one embodiment, an energy harvesting system includes multiple-input-multiple-output switched-capacitor (MI-MOSC) circuitry comprising a plurality of switched-capacitor circuit units to receive a plurality of direct current (DC) input voltages at respective input terminals of the switched-capacitor circuit unit, combine the received DC input voltages, and provide the combined DC input voltages at an output terminal of the switched-capacitor circuit unit. The energy harvesting system also includes maximum power point tracking (MPPT) circuitry coupled to switches of the switched-capacitor circuit units of the MIMOSC circuitry. The MPPT circuitry is to provide a plurality of switching signals to the switches of the switched-capacitor circuit units. The MIMOSC circuitry is to provide a plurality of DC
(Continued)

output voltages to respective loads based on the switching signals from the MPPT circuitry.

25 Claims, 7 Drawing Sheets

(51) Int. Cl.
  *H02J 3/38*   (2006.01)
  *H02M 3/156*  (2006.01)
  *G05F 1/67*   (2006.01)
  *H02M 1/10*   (2006.01)
  *H02M 3/07*   (2006.01)
  *H02M 1/00*   (2006.01)

(52) U.S. Cl.
  CPC ............... *H02M 1/10* (2013.01); *H02M 3/07* (2013.01); *H02M 3/156* (2013.01); *H02J 2300/26* (2020.01); *H02M 2001/007* (2013.01); *H02M 2001/009* (2013.01)

(58) Field of Classification Search
  CPC ..... H02M 2001/009; H02M 2001/007; H02M 2001/0067; G05F 1/67; Y02E 10/56
  See application file for complete search history.

(56) References Cited

U.S. PATENT DOCUMENTS

| | | | |
|---|---|---|---|
| 2014/0184189 A1* | 7/2014 | Salem ................... | H02M 3/158 |
| | | | 323/299 |
| 2014/0246908 A1* | 9/2014 | Chew ........................ | H02J 7/35 |
| | | | 307/24 |
| 2017/0187187 A1* | 6/2017 | Amin ....................... | H02J 3/383 |
| 2019/0028029 A1* | 1/2019 | Bieber .................. | H02M 3/158 |

OTHER PUBLICATIONS

Bandyopadhyay, S. et al, "Platform Architecture for Solar, Thermal, and Vibration Energy Combining With MPPT and Single Inductor," in IEEE Journal of Solid-State Circuits, vol. 47, No. 9, pp. 2199-2215, Sep. 2012.

Liu, X., et al. "A Highly Efficient Reconfigurable Charge Pump Energy Harvester With Wide Harvesting Range and Two-Dimensional MPPT for Internet of Things," in IEEE Journal of Solid-State Circuits, vol. 51, No. 5, pp. 1302-1312, May 2016.

* cited by examiner

ENERGY HARVESTER WITH MULTIPLE-INPUT MULTIPLE-OUTPUT SWITCHED-CAPACITOR (MIMOSC) CIRCUITRY

TECHNICAL FIELD

Embodiments described herein generally relate to energy harvesters, and more particularly to energy harvesters that include switched-capacitor circuitry.

BACKGROUND

Energy harvesting circuits are used to capture, store, or otherwise use energy derived from external sources. These circuits may be used in a variety of devices, and may be particularly useful for Internet of Things (IoT) devices. In some cases, energy harvesting circuits may face at least two challenges. First, device form factor restrictions might call for relatively compact energy harvesting circuitry. Conventional transformer-based circuits have bulky transformers and may not fit in certain device footprints. In addition, inductor-based circuits call for high quality (Q) factor off-chip inductors with large size. Second, for maximum flexibility of a device application, the energy harvester circuit should be able to accommodate various kinds of energy sources, such as photovoltaic sources, thermoelectric sources, fuel cell sources, and the like. However, each of these types of sources have different electrical characteristics and may be difficult to harvest with the same mechanism.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of the disclosed embodiments. The same reference numerals in different figures denote the same elements, while similar reference numerals may, but do not necessarily, denote similar elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of actions, the order of such actions as presented herein is not necessarily the only order in which such actions may be performed, and certain of the stated actions may possibly be omitted and/or certain other actions not described herein may possibly be added to the method. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "in one embodiment" herein do not necessarily all refer to the same embodiment.

Figure 1:
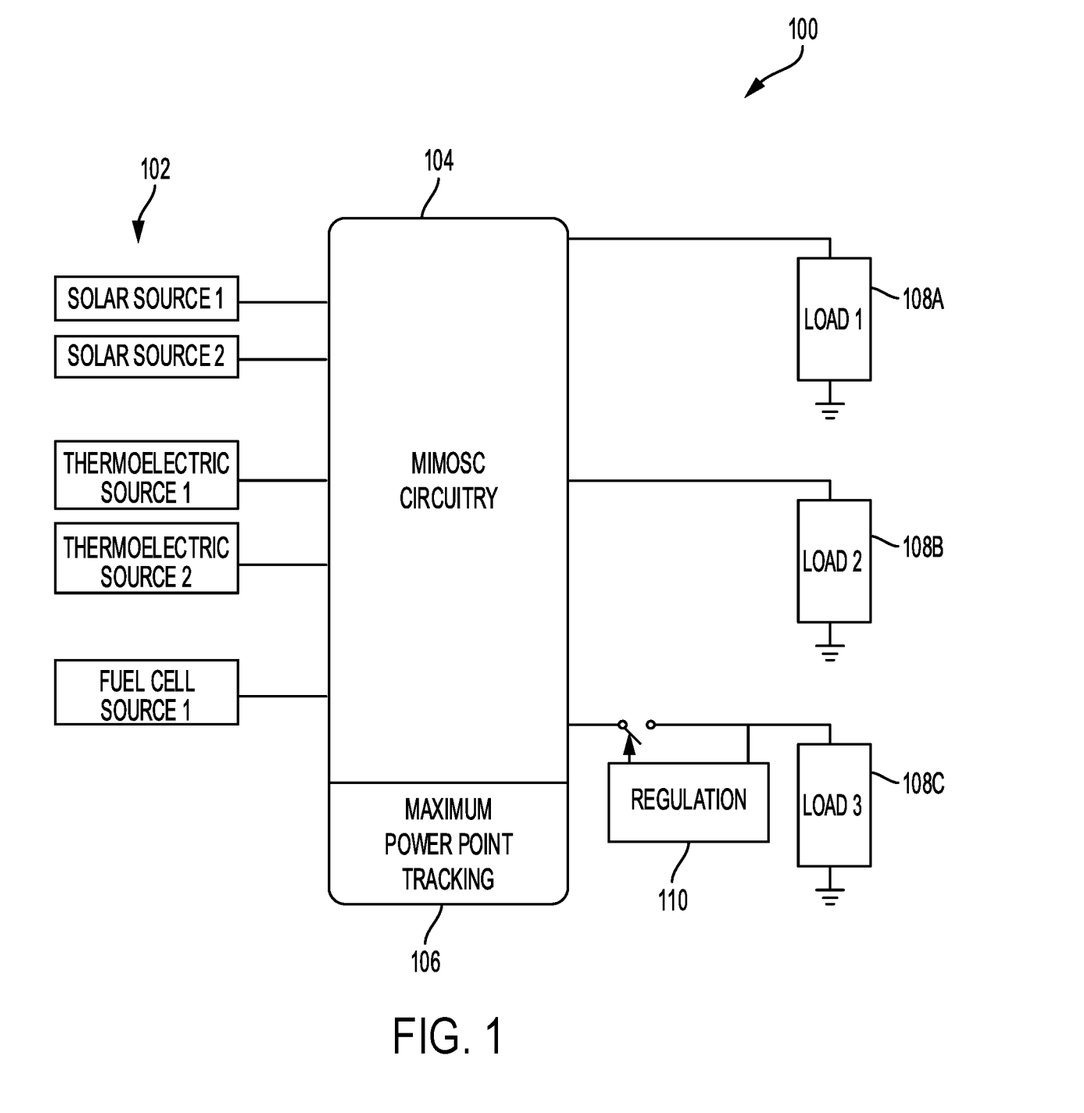
FIG. 1 is a diagram of an example energy harvesting system according to one embodiment.

FIG. 1 is a diagram of an example energy harvesting system 100 according to one embodiment. The example energy harvesting system 100 includes a set of energy sources 102 that are provided to the multiple-input-multiple-output switched-capacitor (MIMOSC) circuitry 104. The example energy sources include two solar energy sources, two thermoelectric energy sources, and a fuel cell energy source. Fewer, additional, or different types of energy sources may be used. The MIMOSC circuitry 104 is coupled to maximum power point tracking (MPPT) circuitry 106 and provides output voltages to loads 108 based on switching signals generated by the MPPT circuitry 106. Each load 108 may include a circuit or circuit device. In some examples, the voltages provided to the loads 108 are used to power digital logic circuitry.

To provide the output voltages to the loads 108, the MIMOSC circuitry 104 provides voltage boosting and energy combining functions for the voltages provided by the energy sources 102. The MPPT circuitry 106 is configured to determine the optimal harvesting conditions of the energy sources 102 and to generate switching signals for the switches of the MIMOSC circuitry 104 accordingly. The MPPT circuitry 106 may generate switching signals for the MIMOSC circuitry based on an impedance of one or more of the loads 108 connected to the MIMOSC circuitry, and the switching signals generated may cause a maximizing of the power delivery to the loads 108. The MPPT circuitry 106 may therefore provide dynamic impedance matching for the loads 108. In some instances, the respective output voltages of the MIMOSC circuitry 104 provided to the respective loads 108 may be different from one another. In the example shown, the loads 108A, 108B are more tolerant of voltage level and ripple magnitude, and can thus directly take the output of the MIMOSC circuitry 104 (which may have the benefit of higher efficiency). The load 108C, on the other hand, is coupled to a regulation circuit 110 to finely tune the output voltage provided to the load 108C. The regulation circuit may provide voltage regulation using any suitable techniques (e.g., pulse-frequency modulation, pulse-width modulation, hysteretic modulation, or another type of voltage regulation).

Figure 5:
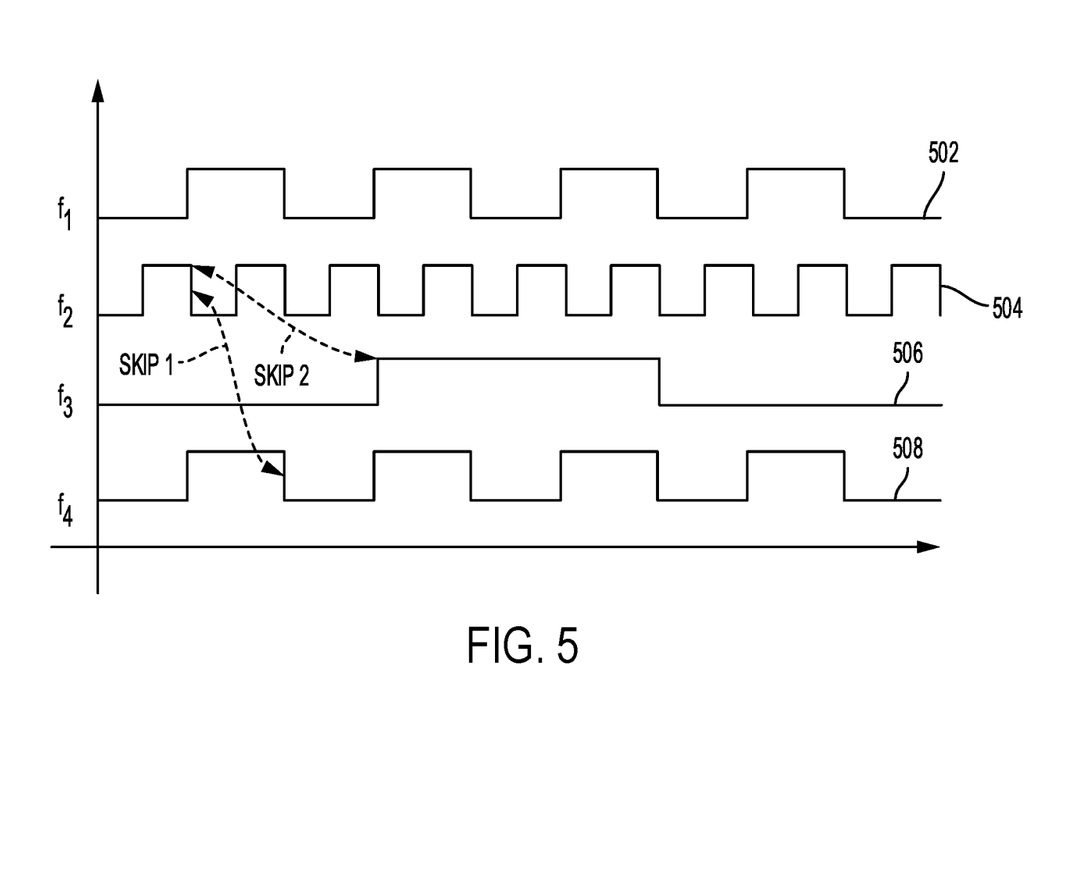
FIG. 5 is a diagram of example switching frequencies for various switched-capacitor circuit units of a MIMOSC circuit according to one embodiment.

The MPPT circuitry 106 may modulate the harvesting of energy from the energy sources 102 on two "levels": on a common mode level and on a differential mode level. The first level, "common-mode", refers to a mode where all of the inputs from identical types of energy sources (e.g., solar versus thermoelectric) that are subject to variation are modulated. For example, in cloudy weather, solar channels may suffer power reduction and a moving of a maximum power point (MPP) used by the MPPT circuitry 106 to modulate the harvesting energy: the switching clock of the entire block may therefore implement a skipping period with respect to a reference frequency. The skipping period may, for example, include 1, 2, or more periods to effect a scaling down of the switching frequency (frequency divide) and modulate the total energy from that block (e.g., as shown in FIG. 5 and described in more detail further below). The second level, "differential mode" refers to a mode where a clock reshaping methodology is used to change a pattern of switching signals in light of a difference between the two inputs of each circuit unit of the MIMOSC circuitry 104. In other words, because the implementation of front-end harvesters may have noticeable differences (e.g. in terms of placement, material, etc.), specific switching frequencies might not be able to achieve simultaneous MPPs for both of the inputs. Therefore, the noted clock reshaping methodology may be used to change the pattern of switching signals (e.g., as shown in FIG. 6B and described in further detail below).

An energy harvesting system such as the energy harvesting system 100 may achieve monolithic integration for multiple channel energy harvesting. For instance, as compared with transformer-based and inductor-based DC-DC power converters, an energy harvesting system according to some demonstrative embodiments may rely only on on-chip metal-insulator-metal (MIM) capacitors. Moreover, the MIM capacitors can be placed above Complementary Metal Oxide Semiconductor (CMOS) devices and may not necessarily require additional size of the silicon microchip. In addition, an energy harvesting system similar to the system 100 may, as compared with time-interleaved solutions, be configured to collect energy from multiple channels, achieving higher power conversion density. An energy harvesting system similar to the energy harvesting system 100 may, as compared with a conventional multi-input single-inductor multiple-output (MISIMO) architectures, allow for the MPPT for various energy sources to be customized and to operate at their respective optimal harvesting points, achieving a global maximum power transfer to loads coupled to the MPPT. Furthermore, using MIMOSC circuitry may allow for modularity, where the silicon area used by the MIMOSC circuitry may be solely determined by the harvesting power capability, and further where only on-chip capacitors may need to be resized (depending on the implementation).

Figure 2:
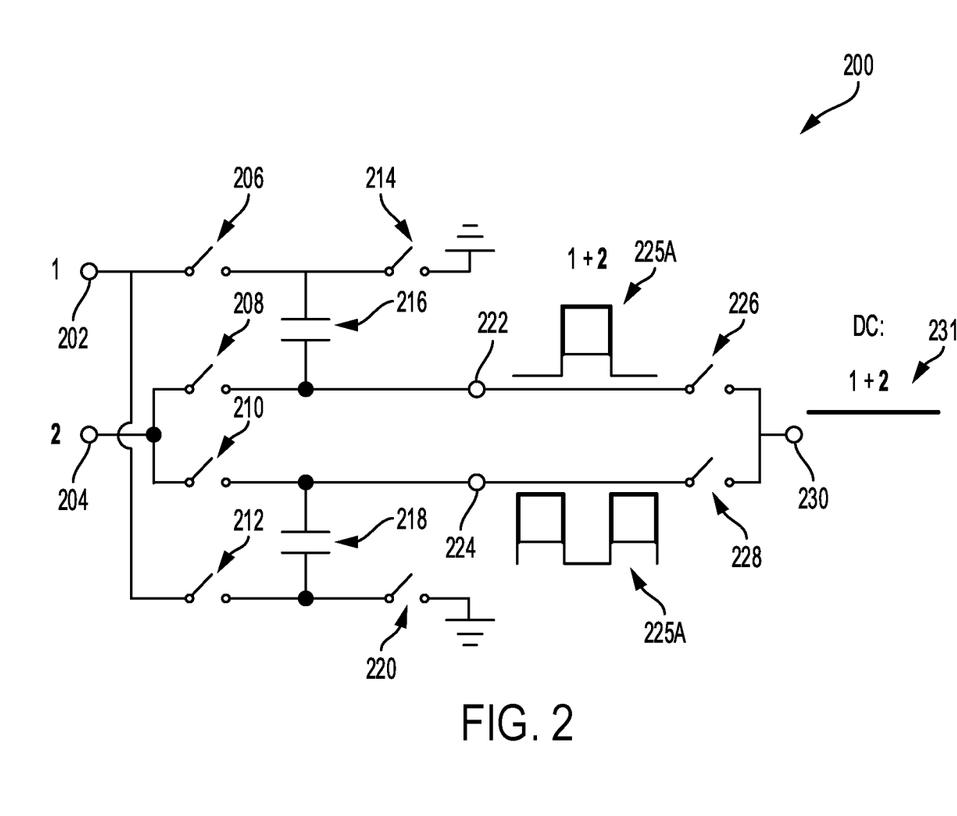
FIG. 2 is a schematic illustration an example switched-capacitor circuit unit of a multiple-input-multiple-output switched-capacitor (MIMOSC) circuit according to one embodiment.

FIG. 2 is a schematic illustration an example switched-capacitor circuit unit 200 of a MIMOSC circuit according to one embodiment. The example switched-capacitor circuit unit 200 includes a first switch 206 between the input terminal 202 and a first (top) terminal of the capacitor 216, a second switch 208 between the input terminal 204 and a second (bottom) terminal of the capacitor 216, a third switch 210 between the input terminal 204 and a first (top) terminal of the capacitor 218, a fourth switch 212 between the input terminal 202 and a second (bottom) terminal of the capacitor 218, a fifth switch 214 between the first (top) terminal of the capacitor 216 and ground, a sixth switch 220 between the second (bottom) terminal of the capacitor 218 and ground, a seventh switch 226 between the second (bottom) terminal of the capacitor 216 and the output terminal 230, and an eighth switch 228 between the first (top) terminal of the capacitor 218 and the output terminal 230. Other configurations of switched-capacitor circuit units are contemplated as well.

The example switched-capacitor circuit unit 200 combines (e.g., adds) direct current (DC) voltages received at the input terminals 202, 204 and provides a combined DC voltage 231 at the output terminal 230. For instance, the voltages received at the input terminals 202, 204 may be added as shown by the combined signals 225 based on switching of the switches in the switched-capacitor circuit unit 200. The switches 206, 210, 220, 226 may switch according to a first switching signal and the switches 208, 212, 214, 228 may switch according to a second switching signal to combine the voltages provided at the input terminals 202, 204. In some cases, the first and second switching signals may have opposite phases (e.g., as shown by the signals 225 in FIG. 2). In some cases, the first and second switching signals may have different frequencies (e.g., as shown and described further below in relation to FIG. 6B).

Figure 3:
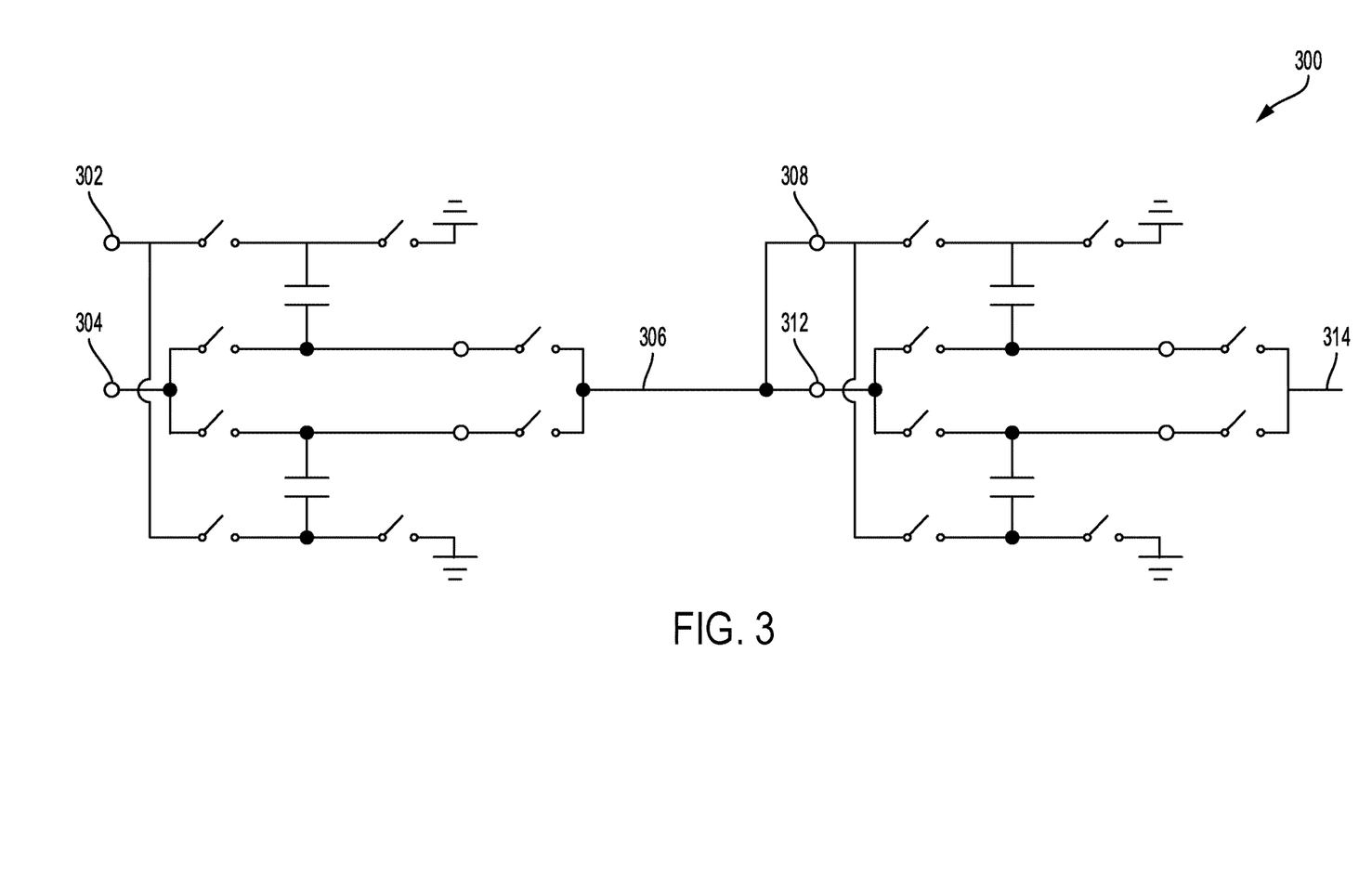
FIG. 3 is a schematic illustration of a cascaded arrangement of switched-capacitor circuit units for a MIMOSC circuit according to one embodiment.

FIG. 3 is a schematic illustration of a cascaded arrangement 300 of switched-capacitor circuit units 310, 320 for a MIMOSC circuit according to one embodiment. Each of the switched-capacitor circuit units 310, 320 is configured in the same manner as the switched-capacitor circuit unit 200 of FIG. 2. The example cascaded arrangement 300 of switched-capacitor circuit units 310, 320 may be used to boost (e.g., double) the combination of input voltages received at input terminals 302, 304. For instance, in the example shown, the switched-capacitor circuit unit 310 combines the voltages received at the input terminals 302, 304 (e.g., in the same manner as described above), and provides the combined voltage at the output terminal 306. The combined voltage at the output terminal 306 is provided to each of the input terminals 308, 312 of the switched-capacitor circuit unit 320. The switched-capacitor circuit unit 320 combines the voltages received at input terminals 308, 312 (e.g., in the same manner as described above) and provides a combined output voltage at its output terminal 314. The voltage at the output terminal 314 may be approximately double the voltage at the output terminal 306. Additional switched-capacitor circuit units may be added to the cascaded arrangement 300 to further boost the combination of input voltages received at the input terminals 302, 304.

Figure 4:
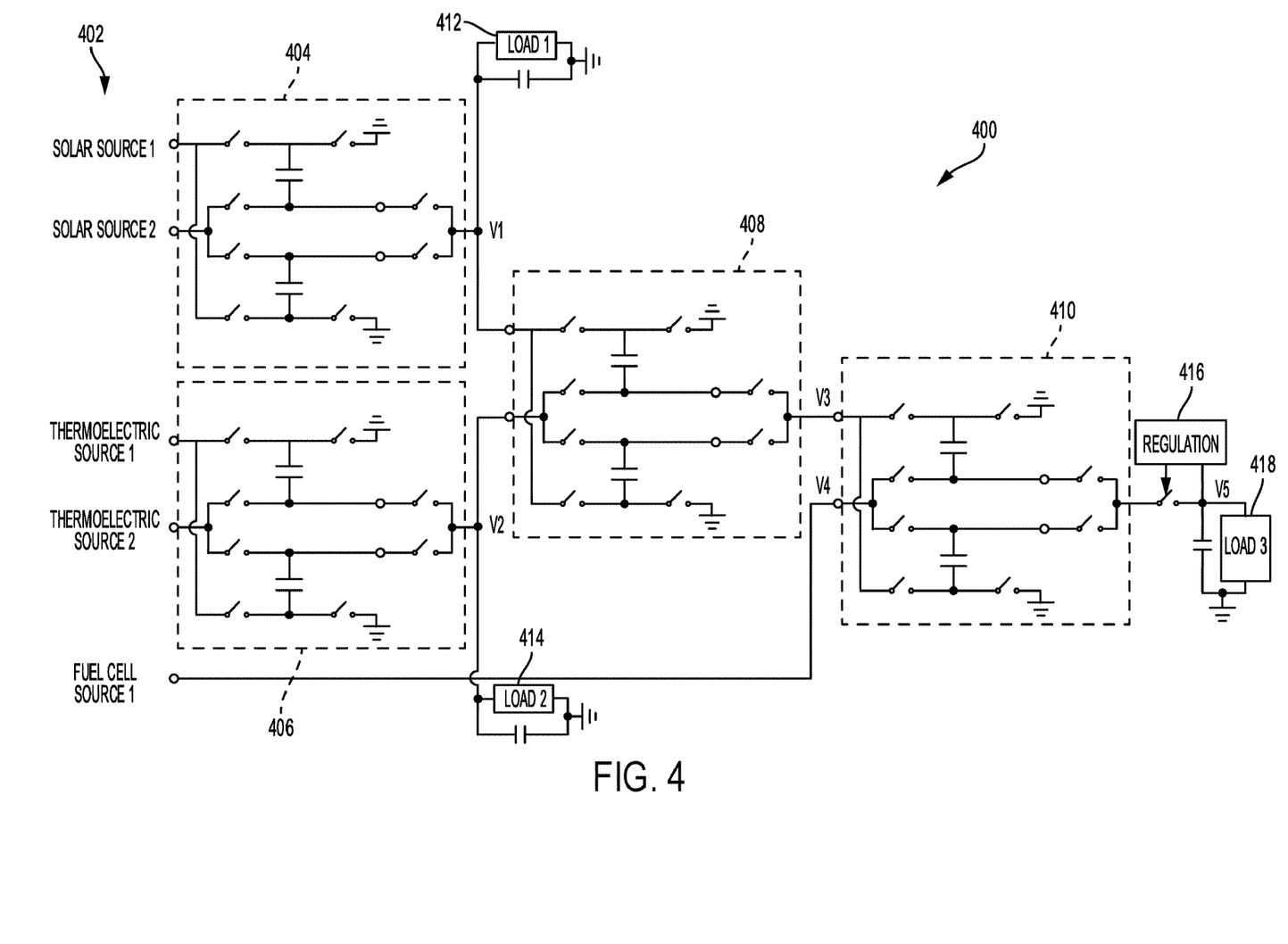
FIG. 4 is a schematic illustration of an example MIMOSC circuit according to one embodiment.

FIG. 4 is a schematic illustration of an example MIMOSC circuit 400 according to one embodiment. The example MIMOSC circuit 400 includes multiple switched-capacitor circuit units 404, 406, 408, 410 that operate to combine the voltages received from the energy sources 402. In the example shown, each of the switched-capacitor circuit units 404, 406, 408, 410 is configured in the same manner as the switched-capacitor circuit 200 of FIG. 2. According to some demonstrative embodiments, other configurations of switched-capacitor circuit units in the MIMOSC circuit 400 are contemplated (e.g., cascaded switched-capacitor circuit units as shown in FIG. 3), and other switched-capacitor circuit unit configurations than those shown are contemplated as well.

In the example shown, the MIMOSC circuit 400 is configured to receive DC voltages from each of the energy sources 402, which include two solar energy sources, two thermoelectric energy sources, and one fuel cell energy source. Other types and configurations of energy sources 402 are contemplated as well. For example, because the same type of energy, such as solar or thermoelectric, may fail under the same condition for multiple incoming channels (e.g., from cloudy weather, bad heat sinking environment, etc.) a group connection as between same energy sources can disable these harvesting units separately based on energy source type without affecting other channels, in this way saving save control power.

The switched-capacitor circuit unit 404 is configured to combine the voltages received from the solar energy sources in the manner described above with respect to FIG. 2 to obtain the DC voltage V1, which is provided to the load 412. Likewise, the switched-capacitor circuit unit 406 combines the voltages received from the thermoelectric energy sources in the manner described above with respect to FIG. 2 to obtain the DC voltage V2, which is provided to the load 414. In addition, the DC voltages V1, V2 are provided as inputs to the switched-capacitor circuit unit 408. The switched-capacitor circuit unit 408 combines the DC voltages V1, V2 in the same manner as described above with respect to FIG. 2 to obtain the DC voltage V3. The DC voltage V3 is then provided as input to the switched-capacitor circuit unit 410 along with the voltage V4 from the fuel cell energy source. The switched-capacitor circuit unit 410 combines the DC voltages V3 and V4, and the combined voltage is regulated by the regulation circuitry 416 to obtain a regulated DC voltage V5, which is provided to the load 418. The regulation circuitry 416 may be any type of suitable DC voltage regulation circuit (e.g., a pulse-frequency modulation circuit or a pulse-width modulation circuit). In some cases, V1 may be 1.8V, V2 may be 0.6V, V3 may be 2.4V, V4 may be 0.4V, and V5 may be a regulated 2.5V.

FIG. 5 is a diagram of example switching frequencies for various switched-capacitor circuit units of a MIMOSC circuit according to one embodiment. In the example shown, the switching signals 502, 504, 506, 508 have different switching frequencies, and may be provided by way of example by a switching clock circuitry. The switching signals 502, 504, 506, 508 may refer to respective reference switching signals provided to the switches of a switched-capacitor circuit unit (e.g., the switched-capacitor unit 200 of FIG. 2) of a MIMOSC circuit (e.g., the MIMOSC circuit 400 of FIG. 4). That is, the signals shown in FIG. 5 may be a reference for the actual switching signals provided to the switches of the respective switched-capacitor circuit units, and the reference signals may be further modified before being provided to the switches. For example, the signals shown may be provided to a portion of the switches of a switched-capacitor circuit unit, and the opposite phase signal may be provided to another portion of the switches (e.g., as described above with respect to FIG. 2). As another example, the signals shown may be frequency divided into a lower frequency switching signal that is provided to a portion of the switches (e.g., as shown with respect to FIG. 6B and described in further detail below).

In some instances, the switching frequencies of the signals 502, 504, 506, 508 may be based on a reference frequency (e.g., the highest switching frequency). For example, the signal 504 may be used as a reference that is frequency divided and used for the other signals 502, 506, 508. In the example shown, for instance, the signal 506 skips two cycles (frequency divided twice) relative to the signal 504, and the signal 508 skips one cycle (frequency divided once) relative to the signal 504.

In some instances, the switching signal 502 may be used as a reference switching frequency for the switched-capacitor circuit unit 404 of FIG. 4, the switching signal 504 may be used as a reference switching frequency for the switched-capacitor circuit unit 406 of FIG. 4, the switching signal 506 may be used as a reference switching frequency for the switched-capacitor circuit unit 408 of FIG. 4, and the switching signal 508 may be used as a reference switching frequency for the switched-capacitor circuit unit 410 of FIG. 4. In general, according to embodiments, differing switching signals may be used as reference switching signals for respective ones of the switched-capacitor circuit units in a MIMOSC circuit.

Figure 6A:
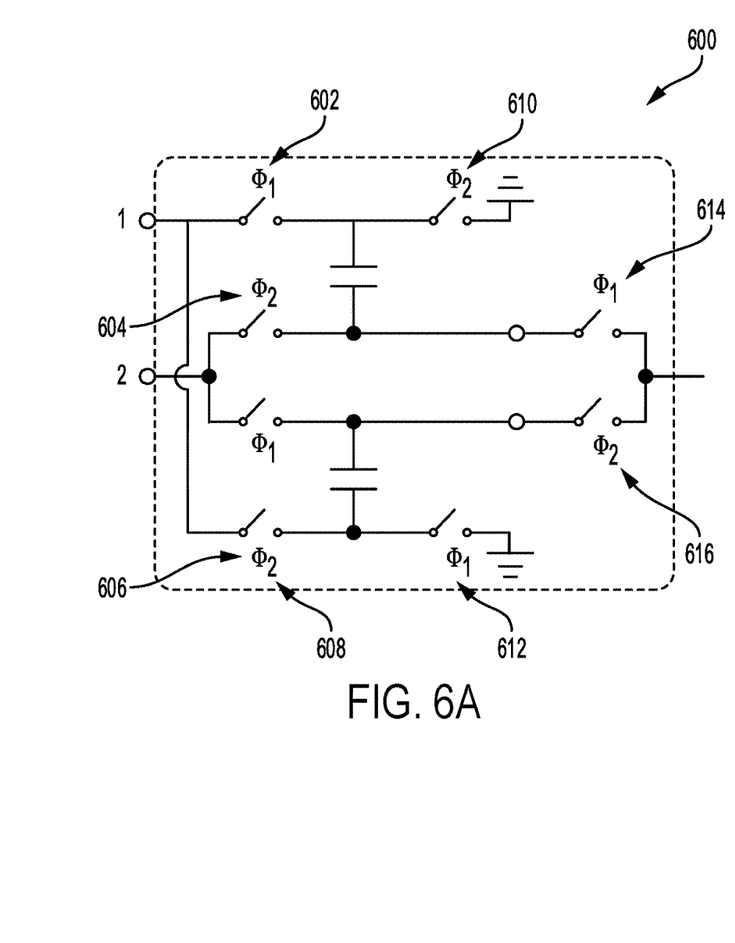
FIG. 6A is a diagram of an example switched-capacitor circuit unit operating with different switching frequencies according to one embodiment.
Figure 6B:
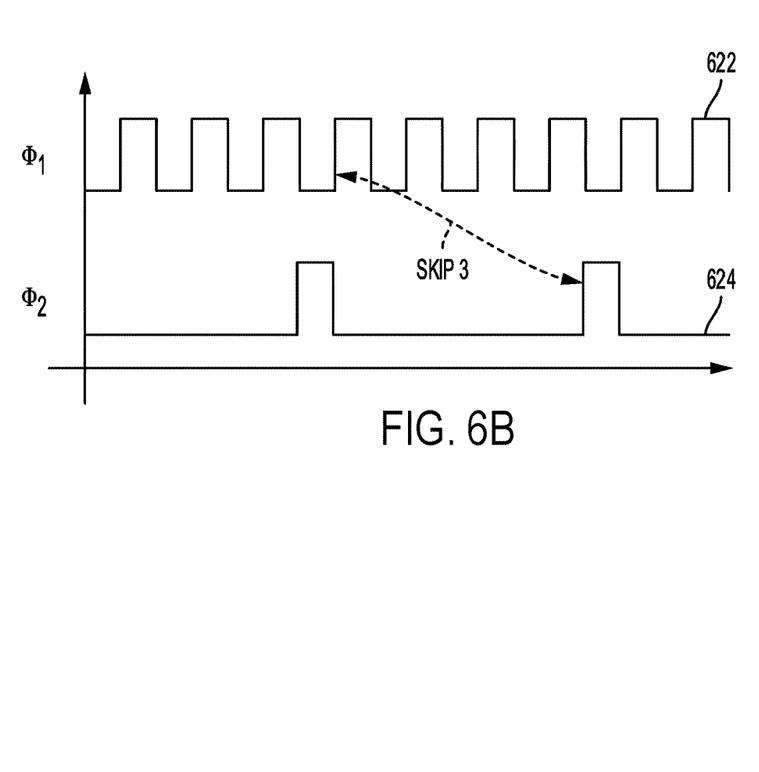
FIG. 6B is a diagram of example switching frequencies for the switched-capacitor circuit unit of FIG. 6A according to one embodiment.

FIG. 6A is a diagram of an example switched-capacitor circuit unit 600 operating with different switching frequencies, and FIG. 6B is a diagram of example switching frequencies for the switched-capacitor circuit unit of FIG. 6A according to one embodiment. The example switched-capacitor circuit unit 600 is configured in the same manner as the switched-capacitor circuit unit 200 of FIG. 2, and includes switches 602, 604, 606, 608, 610, 612, 614, 616. The switches 602, 606, 612, 614 may be switched according to the switching signal 622, while the switches 604, 608, 610, 616 may be switched according to the switching signal 624. In the example shown, the switching signal 622 is used as a reference for the switching signal 624. The switching signal 624 skips three cycles (frequency divided three times) relative to the switching signal 622. For instance, in the example shown, input 1 may be assumed to have more available power, which may override the following charging period for input 2. The number of overriding or skipped periods can be 1, 2, etc., which determines the equivalent duty ratio from inputs 1 and 2. Therefore, the extracting strengths from each of the two inputs are different and non-identical MPPs are instantiated.

Figure 7:
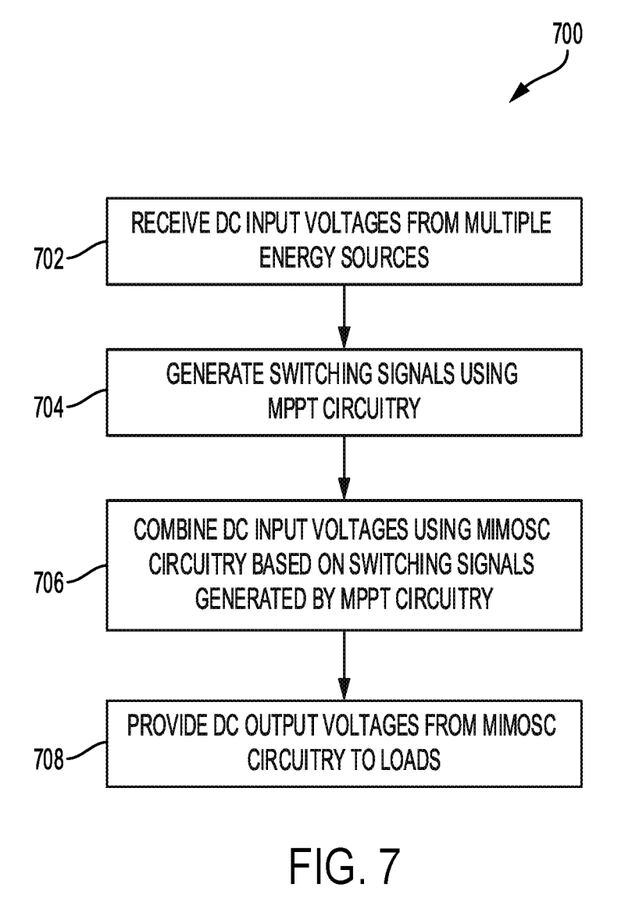
FIG. 7 is a flow diagram of an example process for harvesting energy using a MIMOSC circuit according to one embodiment.

FIG. 7 is a flow diagram of an example process for harvesting energy using a MIMOSC circuit according to one embodiment. Operations in the example process 700 may be performed by components of an energy harvesting system with MIMOSC circuitry (e.g., the energy harvesting system 100 of FIG. 1 with the MIMOSC circuit 400 of FIG. 4). The example process 700 may include additional or different operations, and the operations may be performed in the order shown or in another order. In some cases, one or more of the operations shown in FIG. 7 are implemented as processes that include multiple operations, sub-processes, or other types of routines. In some cases, operations can be combined, performed in another order, performed in parallel, iterated, or otherwise repeated or performed another manner.

At 702, DC input voltages are received from multiple energy sources. The energy sources may include one or more of a solar energy source, a thermoelectric energy source, a fuel cell energy source, or another type of energy source. The DC input voltages may be received at the input terminals of various switched-capacitor circuit units (e.g., switched-capacitor circuit units similar to the switched-capacitor circuit unit 200 of FIG. 2) of MIMOSC circuitry (e.g., MIMOSC circuitry similar to the MIMOSC circuit 400 of FIG. 4).

At 704, switching signals are generated using MPPT circuitry. The switching signals may be generated by the MPPT to maximize power extraction from the DC input voltages received at 702. The MPPT circuitry may generate switching signals for an MIMOSC circuit based on an impedance of one or more loads connected to the MIMOSC circuit. The switching signals generated may attempt to maximize power delivery to the load, and may therefore provide dynamic impedance matching for the loads connected to the MIMOSC circuitry.

At 706, the DC input voltages are combined using MIMOSC circuitry based on the switching signals generated by the MPPT circuitry. The DC input voltages may be combined by switched-capacitor circuit units of the MIMOSC circuitry. For example, the DC input voltages may be combined by a switched-capacitor circuit unit configured similar to the switched-capacitor circuit unit 200 and in the same manner as described above with respect to the same. The DC input voltages may be combined by sets of switched-capacitor circuit units in the MIMOSC to provide DC output voltages to multiple terminals. The DC output voltages provided by the MIMOSC circuitry may have the same or different voltage level, depending on the configuration of the MIMOSC circuitry.

At 708, the DC output voltages from the MIMOSC circuitry are provided to loads. The loads may be any suitable circuit or circuit device. In some instances, the loads may be circuits of a connected device, such as an IoT device. For example, in some cases, the DC output voltages from the MIMOSC are provided as a logic level voltage to power logic circuits (e.g., 1.8V, 2.5V, or 3.3V for CMOS logic, Transistor-Transistor Logic (TTL), LVCMOS, LVTTL, etc.).

Functions, operations, components and/or features described herein with reference to one or more embodiments, may be combined with, or may be utilized in combination with, one or more other functions, operations, components and/or features described herein with reference to one or more other embodiments, or vice versa.

EXAMPLES

The following examples pertain to further embodiments. It will be understood that certain examples listed below may be combined with other examples, or certain aspects of other examples.

Example 1 includes an energy harvesting system, comprising: multiple-input-multiple-output switched-capacitor (MIMOSC) circuitry comprising a plurality of switched-capacitor circuit units to: receive a plurality of direct current (DC) input voltages at respective input terminals of the switched-capacitor circuit unit; combine the received DC input voltages; and provide the combined DC input voltages at an output terminal of the switched-capacitor circuit unit; and maximum power point tracking (MPPT) circuitry coupled to switches of the switched-capacitor circuit units of the MIMOSC circuitry, the MPPT circuitry to provide a plurality of switching signals to the switches of the switched-capacitor circuit units; wherein the MIMOSC circuitry is to provide a plurality of DC output voltages to respective loads based on the switching signals from the MPPT circuitry.

Example 2 includes the subject matter of Example 1, and optionally, wherein at least one switched-capacitor circuit unit comprises: a first capacitor; a second capacitor; a first switch between a first input terminal of the switched-capacitor circuit unit and a first terminal of the first capacitor; a second switch between a second input terminal of the switched-capacitor circuit unit and a second terminal of the first capacitor; a third switch between the second input terminal of the switched-capacitor circuit unit and a first terminal of the second capacitor; a fourth switch between the first input terminal of the switched-capacitor circuit unit and a second terminal of the second capacitor; a fifth switch between the first terminal of the first capacitor and ground; a sixth switch between the second terminal of the second capacitor and ground;
a seventh switch between the second terminal of the first capacitor and an output terminal of the switched-capacitor circuit unit; and an eighth switch between the first terminal of the second capacitor and the output terminal of the switched-capacitor circuit unit.

Example 3 includes the subject matter of Example 2, and optionally, wherein: the first, third, sixth, and seventh switch are coupled to a first switching signal of the MPPT circuitry; and the second, fourth, fifth, and eighth switch are coupled to a second switching signal of the MPPT circuitry.

Example 4 includes the subject matter of Example 3, and optionally, wherein MPPT circuitry is to provide the first and second switching signals at a common frequency.

Example 5 includes the subject matter of Example 3, and optionally, wherein MPPT circuitry is to provide the first and second switching signals at different frequencies.

Example 6 includes the subject matter of Example 1, and optionally, wherein a first switched-capacitor circuit unit is to operate at a first switching frequency, and a second switched-capacitor circuit unit is to operate at a second switching frequency.

Example 7 includes the subject matter of Example 1, and optionally, wherein the MIMOSC circuitry comprises cascaded switched-capacitor circuit units.

Example 8 includes the subject matter of Example 1, and optionally, further comprising regulation circuitry to regulate at least one of the DC output voltages.

Example 9 includes the subject matter of Example 1, and optionally, further comprising a plurality of energy sources to provide the DC input voltages, the energy sources comprising at least one of a solar energy source, a thermoelectric energy source, and a fuel cell source.

Example 10 includes the subject matter of Example 1, and optionally, wherein the MIMOSC circuitry is to provide different DC output voltages to the loads.

Example 11 includes the subject matter of Example 1, and optionally, further comprising loads coupled to the MIMOSC circuitry, each load to receive a respective DC output voltage of the MIMOSC circuitry.

Example 12 includes the subject matter of Example 1, and optionally, wherein the MPPT circuitry is to generate the switching signals based on an impedance of the loads.

Example 13 includes a multiple-input-multiple-output switched-capacitor (MIMOSC) circuit, comprising: a first switched-capacitor circuit unit, the first switched-capacitor circuit unit comprising a set of first switched-capacitors to: receive a first input direct current (DC) voltage at a first input terminal of the first switched-capacitor circuit unit; receive a second input direct current (DC) voltage at a second input terminal of the first switched-capacitor circuit unit; combine the first and second input DC voltages into a first DC output voltage based on a switching frequency of the first switched-capacitors; and provide the first DC output voltage at an output terminal of the first switched-capacitor circuit unit; and second switched-capacitor circuit unit comprising a set of second switched-capacitors to: receive a third input direct current (DC) voltage at a first input terminal of the second switched-capacitor circuit unit; receive a fourth input direct current (DC) voltage at a second input terminal of the second switched-capacitor circuit unit; combine the third and fourth input DC voltages into a second DC output voltage based on a switching frequency of the second switched-capacitors; and provide the second DC output voltage at an output terminal of the second switched-capacitor circuit unit.

Example 14 includes the subject matter of Example 13, and optionally, wherein the first switched-capacitor circuit unit comprises: a first capacitor; a second capacitor; a first switch between the first input terminal of the first switched-capacitor circuit unit and a first terminal of the first capacitor; a second switch between the second input terminal of the first switched-capacitor circuit unit and a second terminal of the first capacitor; a third switch between the second input terminal of the first switched-capacitor circuit unit and a first terminal of the second capacitor; a fourth switch between the first input terminal of the first switched-capacitor circuit unit and a second terminal of the second capacitor; a fifth switch between the first terminal of the first capacitor and ground; a sixth switch between the second terminal of the second capacitor and ground; a seventh switch between the second terminal of the first capacitor and the output terminal of the first switched-capacitor circuit unit; and an eighth switch between the second terminal of the first capacitor and the output terminal of the first switched-capacitor circuit unit.

Example 15 includes the subject matter of Example 14, and optionally, wherein:
the first, third, sixth, and seventh switch are to couple to a first switching signal; and the second, fourth, fifth, and eighth switch are to couple to a second switching signal.

Example 16 includes the subject matter of Example 13, and optionally, further comprising a third switched-capacitor circuit unit comprising a set of third switched-capacitors to: receive the first output DC voltage at a first input terminal of the third switched-capacitor circuit unit; receive the second output DC voltage at a second input terminal of the third switched-capacitor circuit unit; combine the first and second output DC voltages into a third output DC voltage based on a switching frequency of the third switched-capacitors; and provide the third output DC voltage at an output terminal of the third switched-capacitor circuit unit.

Example 17 includes the subject matter of Example 13, and optionally, further comprising a third switched-capacitor circuit unit comprising a set of third switched-capacitors to: receive a fifth input DC voltage at a first input terminal of the third switched-capacitor circuit unit; receive the first output DC voltage a second input terminal of the third switched-capacitor circuit unit; combine the fifth input DC voltage and the first output DC voltage into a third output DC voltage based on a switching frequency of the third switched-capacitors; and provide the third output DC voltage at an output terminal of the third switched-capacitor circuit unit.

Example 18 includes the subject matter of Example 13, and optionally, further comprising a third switched-capacitor circuit unit comprising a set of third switched-capacitors to: receive the first output DC voltage at each input terminal of the third switched-capacitor circuit unit; combine the first output DC voltages into a third output DC voltage based on a switching frequency of the third switched-capacitors; and provide the third output DC voltage at an output terminal of the third switched-capacitor circuit unit.

Example 19 includes the subject matter of Example 13, and optionally, further comprising a regulation circuit coupled to an output of at least one of the first switched-capacitor circuit unit or the second switched-capacitor circuit unit.

Example 20 includes the subject matter of Example 13, and optionally, wherein the first switched-capacitor circuit unit is to operate at a first switching frequency, and the second switched-capacitor circuit unit is to operate at a second switching frequency.

Example 21 includes a method, comprising: receiving a plurality of direct current (DC) input voltages; generating a plurality of switching signals using maximum power point tracking (MPPT) circuitry; combining the DC input voltages using multiple-input-multiple-output switched-capacitor (MIMOSC) circuitry, wherein the MIMOSC circuitry comprises switched-capacitor circuit units to combine the DC input voltages based on the switching signals; and providing a plurality of DC output voltages to respective loads, wherein the DC output voltages are based on outputs of the switched-capacitor circuit units of the MIMOSC circuitry.

Example 22 includes the subject matter of Example 21, and optionally, wherein combining the DC input voltages comprises: switching a first switched-capacitor circuit unit of the MIMOSC circuitry at a first switching frequency; and switching a second switched-capacitor circuit unit of the MIMOSC circuitry at a second switching frequency.

Example 23 includes the subject matter of Example 21, and optionally, further comprising: providing a first switching signal to a first set of switches of a first switched-capacitor circuit unit of the MIMOSC circuitry; and providing a second switching signal to a second set of switches of the first switched-capacitor circuit unit of the MIMOSC circuitry; wherein the first and second switching signal have an opposite phase.

Example 24 includes the subject matter of Example 23, and optionally, wherein the first and second signals have different switching frequencies.

Example 25 includes the subject matter of Example 21, and optionally, wherein providing the output DC voltage comprises regulating one or more of the DC output voltage using a regulation circuit.

Example 26 includes the subject matter of Example 21, and optionally, further comprising: combining a first set of the DC input voltages using a first switched-capacitor circuit unit of the MIMOSC circuitry based on a first set of switching signals; and combining a second set of the DC input voltages using a second switched-capacitor circuit unit of the MIMOSC circuitry based on a second set of switching signals; wherein the DC output voltages are based on the combined first set of DC input voltages and the combined second set of DC input voltages.

Example 27 includes the subject matter of 21, and optionally, wherein generating the plurality of switching signals using the MPPT circuitry comprises generating the switching signals by impedance matching the MIMOSC circuitry and the loads.

Example 28 includes an apparatus comprising: means for receiving a plurality of direct current (DC) input voltages; means for generating a plurality of switching signals using maximum power point tracking (MPPT) circuitry; means for combining the DC input voltages using multiple-input-multiple-output switched-capacitor (MIMOSC) circuitry, wherein the MIMOSC circuitry comprises switched-capacitor circuit units to combine the DC input voltages based on the switching signals; and means for providing a plurality of DC output voltages to respective loads, wherein the DC output voltages are based on outputs of the switched-capacitor circuit units of the MIMOSC circuitry.

Example 29 includes the subject matter of Example 20, and optionally, wherein the means for combining the DC input voltages comprises: means for switching a first switched-capacitor circuit unit of the MIMOSC circuitry at a first switching frequency; and means for switching a second switched-capacitor circuit unit of the MIMOSC circuitry at a second switching frequency.

Example 30 includes the subject matter of Example 20, and optionally, further comprising: means for providing a first switching signal to a first set of switches of a first switched-capacitor circuit unit of the MIMOSC circuitry; and means for providing a second switching signal to a second set of switches of the first switched-capacitor circuit unit of the MIMOSC circuitry; wherein the first and second switching signal have an opposite phase.

Example 31 includes the subject matter of Example 22, and optionally, wherein the first and second signals have different switching frequencies.

Example 32 includes the subject matter of Example 20, and optionally, wherein the means for providing the output DC voltage comprises means for regulating one or more of the DC output voltage using a regulation circuit.

Example 33 includes the subject matter of Example 20, and optionally, further comprising: means for combining a first set of the DC input voltages using a first switched-capacitor circuit unit of the MIMOSC circuitry based on a first set of switching signals to obtain a combined first set of DC input voltages; and means for combining a second set of the DC input voltages using a second switched-capacitor circuit unit of the MIMOSC circuitry based on a second set of switching signals to obtain a combined second set of DC input voltages; wherein the DC output voltages are based on the combined first set of DC input voltages and the combined second set of DC input voltages.

Example 34 includes a product comprising one or more tangible computer-readable non-transitory storage media comprising computer-executable instructions operable to, when executed by at least one computer processor, cause the at least one computer processor to implement operations comprising: receiving a plurality of direct current (DC) input voltages; generating a plurality of switching signals using maximum power point tracking (MPPT) circuitry; combining the DC input voltages using multiple-input-multiple-output switched-capacitor (MIMOSC) circuitry, wherein the MIMOSC circuitry comprises switched-capacitor circuit units to combine the DC input voltages based on the switching signals; and providing a plurality of DC output voltages to respective loads, wherein the DC output voltages are based on outputs of the switched-capacitor circuit units of the MIMOSC circuitry.

Example 35 includes the subject matter of Example 20, and optionally, wherein combining the DC input voltages comprises: switching a first switched-capacitor circuit unit of the MIMOSC circuitry at a first switching frequency, and switching a second switched-capacitor circuit unit of the MIMOSC circuitry at a second switching frequency.

Example 36 includes the subject matter of Example 20, and optionally, wherein the operations further include: providing a first switching signal to a first set of switches of a first switched-capacitor circuit unit of the MIMOSC circuitry; and providing a second switching signal to a second set of switches of the first switched-capacitor circuit unit of the MIMOSC circuitry; wherein the first and second switching signal have an opposite phase.

Example 37 includes the subject matter of Example 22, and optionally, wherein the first and second signals have different switching frequencies.

Example 38 includes the subject matter of Example 20, and optionally, wherein providing the output DC voltage comprises regulating one or more of the DC output voltage using a regulation circuit.

Example 39 includes the subject matter of Example 20, and optionally, wherein the operations further comprise: combining a first set of the DC input voltages using a first switched-capacitor circuit unit of the MIMOSC circuitry based on a first set of switching signals to obtain a combined first set of DC input voltages; and combining a second set of the DC input voltages using a second switched-capacitor circuit unit of the MIMOSC circuitry based on a second set of switching signals to obtain a combined second set of DC input voltages; wherein the DC output voltages are based on the combined first set of DC input voltages and the combined second set of DC input voltages.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An energy harvesting system, comprising:
   multiple-input-multiple-output switched-capacitor (MIMOSC) circuitry comprising a plurality of switched-capacitor circuit units to:
      receive a plurality of direct current (DC) input voltages at respective input terminals of the switched-capacitor circuit unit;
      combine the received DC input voltages; and
      provide the combined DC input voltages at an output terminal of the switched-capacitor circuit unit; and
   maximum power point tracking (MPPT) circuitry coupled to switches of the switched-capacitor circuit units of the MIMOSC circuitry, the MPPT circuitry to provide a plurality of switching signals to the switches of the switched-capacitor circuit units;
   wherein the MIMOSC circuitry does not include an inductor and is to provide a plurality of DC output voltages to respective loads based on the switching signals from the MPPT circuitry.

2. The energy harvesting system of claim 1, wherein at least one switched-capacitor circuit unit of the plurality of switched-capacitor circuit units comprises:
   a first capacitor;
   a second capacitor;
   a first switch between a first input terminal of the switched-capacitor circuit unit and a first terminal of the first capacitor;

a second switch between a second input terminal of the switched-capacitor circuit unit and a second terminal of the first capacitor;
a third switch between the second input terminal of the switched-capacitor circuit unit and a first terminal of the second capacitor;
a fourth switch between the first input terminal of the switched-capacitor circuit unit and a second terminal of the second capacitor;
a fifth switch between the first terminal of the first capacitor and ground;
a sixth switch between the second terminal of the second capacitor and ground;
a seventh switch between the second terminal of the first capacitor and an output terminal of the switched-capacitor circuit unit; and
an eighth switch between the first terminal of the second capacitor and the output terminal of the switched-capacitor circuit unit.

3. The energy harvesting system of claim 2, wherein:
the first, third, sixth, and seventh switches are coupled to a first switching signal of the MPPT circuitry; and
the second, fourth, fifth, and eighth switch are coupled to a second switching signal of the MPPT circuitry.

4. The energy harvesting system of claim 3, wherein MPPT circuitry is to provide the first and second switching signals at a common frequency.

5. The energy harvesting system of claim 3, wherein MPPT circuitry is to provide the first and second switching signals at different frequencies.

6. The energy harvesting system of claim 1, wherein a first switched-capacitor circuit unit is to operate at a first switching frequency, and a second switched-capacitor circuit unit is to operate at a second switching frequency.

7. The energy harvesting system of claim 1, wherein the MIMOSC circuitry comprises cascaded switched-capacitor circuit units.

8. The energy harvesting system of claim 1, further comprising regulation circuitry to regulate at least one of the DC output voltages.

9. The energy harvesting system of claim 1, further comprising a plurality of energy sources to provide the DC input voltages, the energy sources comprising at least one of a solar energy source, a thermoelectric energy source, and a fuel cell source.

10. The energy harvesting system of claim 1, wherein the MIMOSC circuitry is to provide different DC output voltages to the loads.

11. The energy harvesting system of claim 1, further comprising loads coupled to the MIMOSC circuitry, each load to receive a respective DC output voltage of the MIMOSC circuitry, wherein the MPPT circuitry is the provide the switching signals based on impedances of the loads.

12. An energy harvesting circuit, comprising:
a first switched-capacitor circuit unit, the first switched-capacitor circuit unit comprising a set of first switched-capacitors to:
receive a first input direct current (DC) voltage at a first input terminal of the first switched-capacitor circuit unit;
receive a second input direct current (DC) voltage at a second input terminal of the first switched-capacitor circuit unit;
combine the first and second input DC voltages into a first DC output voltage based on a switching frequency of the first switched-capacitors; and
provide the first DC output voltage at an output terminal of the first switched-capacitor circuit unit; and
a second switched-capacitor circuit unit comprising a set of second switched-capacitors to:
receive a third input direct current (DC) voltage at a first input terminal of the second switched-capacitor circuit unit;
receive a fourth input direct current (DC) voltage at a second input terminal of the second switched-capacitor circuit unit;
combine the third and fourth input DC voltages into a second DC output voltage based on a switching frequency of the second switched-capacitors; and
provide the second DC output voltage at an output terminal of the second switched-capacitor circuit unit; and
maximum power point tracking (MPPT) circuitry coupled to switches of the first and second switched-capacitor circuit units, the MPPT circuitry to provide a plurality of switching signals to the switches of the first and second switched-capacitor circuit units.

13. The energy harvesting circuit of claim 12, wherein the first switched-capacitor circuit unit comprises:
a first capacitor;
a second capacitor;
a first switch between the first input terminal of the first switched-capacitor circuit unit and a first terminal of the first capacitor;
a second switch between the second input terminal of the first switched-capacitor circuit unit and a second terminal of the first capacitor;
a third switch between the second input terminal of the first switched-capacitor circuit unit and a first terminal of the second capacitor;
a fourth switch between the first input terminal of the first switched-capacitor circuit unit and a second terminal of the second capacitor;
a fifth switch between the first terminal of the first capacitor and ground;
a sixth switch between the second terminal of the second capacitor and ground;
a seventh switch between the second terminal of the first capacitor and the output terminal of the first switched-capacitor circuit unit; and
an eighth switch between the first terminal of the second capacitor and the output terminal of the first switched-capacitor circuit unit.

14. The energy harvesting circuit of claim 13, wherein:
the first, third, sixth, and seventh switch are to couple to a first switching signal; and
the second, fourth, fifth, and eighth switch are to couple to a second switching signal.

15. The energy harvesting circuit of claim 12, further comprising a third switched-capacitor circuit unit comprising a set of third switched-capacitors to:
receive the first output DC voltage at a first input terminal of the third switched-capacitor circuit unit;
receive the second output DC voltage at a second input terminal of the third switched-capacitor circuit unit;
combine the first and second output DC voltages into a third output DC voltage based on a switching frequency of the third switched-capacitors; and
provide the third output DC voltage at an output terminal of the third switched-capacitor circuit unit.

16. The energy harvesting circuit of claim 12, further comprising a third switched-capacitor circuit unit comprising a set of third switched-capacitors to:

receive a fifth input DC voltage at a first input terminal of the third switched-capacitor circuit unit;

receive the first output DC voltage at a second input terminal of the third switched-capacitor circuit unit;

combine the fifth input DC voltage and the first output DC voltage into a third output DC voltage based on a switching frequency of the third switched-capacitors; and provide the third output DC voltage at an output terminal of the third switched-capacitor circuit unit.

17. The energy harvesting circuit of claim 12, further comprising a third switched-capacitor circuit unit comprising a set of third switched-capacitors to:

receive the first output DC voltage at each input terminal of the third switched-capacitor circuit unit;

combine the first output DC voltages into a third output DC voltage based on a switching frequency of the third switched-capacitors; and provide the third output DC voltage at an output terminal of the third switched-capacitor circuit unit.

18. The energy harvesting circuit of claim 12, further comprising a regulation circuit coupled to an output of at least one of the first switched-capacitor circuit unit or the second switched-capacitor circuit unit.

19. The energy harvesting circuit of claim 12, wherein the first switched-capacitor circuit unit is to operate at a first switching frequency, and the second switched-capacitor circuit unit is to operate at a second switching frequency.

20. A method, comprising:

receiving a plurality of direct current (DC) input voltages;

generating a plurality of switching signals using maximum power point tracking (MPPT) circuitry;

combining the DC input voltages using multiple-input-multiple-output switched-capacitor (MIMOSC) circuitry, wherein the MIMOSC circuitry does not include an inductor and comprises switched-capacitor circuit units to combine a set of DC input voltages based on the switching signals; and providing a plurality of DC output voltages to respective loads, wherein the DC output voltages are based on outputs of the switched-capacitor circuit units of the MIMOSC circuitry.

21. The method of claim 20, wherein combining the DC input voltages comprises:

switching a first switched-capacitor circuit unit of the MIMOSC circuitry at a first switching frequency; and switching a second switched-capacitor circuit unit of the MIMOSC circuitry at a second switching frequency.

22. The method of claim 20, further comprising:

providing a first switching signal to a first set of switches of a first switched-capacitor circuit unit of the MIMOSC circuitry; and providing a second switching signal to a second set of switches of the first switched-capacitor circuit unit of the MIMOSC circuitry;

wherein the first and second switching signal have an opposite phase.

23. The method of claim 22, wherein the first and second signals have different switching frequencies.

24. The method of claim 20, wherein providing the output DC voltage comprises regulating one or more of the DC output voltage using a regulation circuit.

25. The method of claim 20, further comprising:

combining a first set of the DC input voltages using a first switched-capacitor circuit unit of the MIMOSC circuitry based on a first set of switching signals to obtain a combined first set of DC input voltages; and combining a second set of the DC input voltages using a second switched-capacitor circuit unit of the MIMOSC circuitry based on a second set of switching signals to obtain a combined second set of DC input voltages;

wherein the DC output voltages are based on the combined first set of DC input voltages and the combined second set of DC input voltages.

* * * * *